United States Patent
Okamura et al.

(10) Patent No.: US 11,458,962 B2
(45) Date of Patent: Oct. 4, 2022

(54) AUTOMATIC PARKING SYSTEM

(71) Applicant: Toyota Jidosha Kabushiki Kaisha, Toyota Aichi-ken (JP)

(72) Inventors: Ryuji Okamura, Gotemba (JP); Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 17/071,144

(22) Filed: Oct. 15, 2020

(65) Prior Publication Data

US 2021/0122362 A1     Apr. 29, 2021

(30) Foreign Application Priority Data

Oct. 25, 2019   (JP) .............................. JP2019-194617

(51) Int. Cl.
| | | |
|---|---|---|
| B60W 30/00 | (2006.01) | |
| B60W 30/06 | (2006.01) | |
| G08G 1/14 | (2006.01) | |
| G05D 1/00 | (2006.01) | |
| B60W 50/02 | (2012.01) | |
| G07C 5/08 | (2006.01) | |
| B60W 60/00 | (2020.01) | |

(52) U.S. Cl.
CPC ........ B60W 30/06 (2013.01); B60W 50/0205 (2013.01); B60W 60/001 (2020.02); G05D 1/0011 (2013.01); G07C 5/0808 (2013.01); G08G 1/143 (2013.01)

(58) Field of Classification Search
CPC ............. B60W 30/06; B60W 50/0205; B60W 60/001; G05D 1/0011; G07C 5/0808; G07C 5/008; G08G 1/143; G08G 1/168; G08G 1/146; G08G 1/205; B62D 15/0285; G07B 15/00
See application file for complete search history.

(56) References Cited

U.S. PATENT DOCUMENTS

| | | | |
|---|---|---|---|
| 10,156,848 B1 * | 12/2018 | Konrardy | ........ B60W 30/18163 |
| 10,387,738 B2 * | 8/2019 | Nordbruch | ............ B60W 30/06 |

(Continued)

FOREIGN PATENT DOCUMENTS

| | | |
|---|---|---|
| JP | 2015-230641 A | 12/2015 |
| JP | 2018-060450 A | 4/2018 |
| JP | 2019-174168 A | 10/2019 |

*Primary Examiner* — Peter D Nolan
*Assistant Examiner* — Peter Y Ning
(74) *Attorney, Agent, or Firm* — Dinsmore & Shohl LLP

(57) ABSTRACT

An automatic parking system park autonomous driving vehicles in a target parking space in a parking lot by instructing the autonomous driving vehicle in the parking lot. The system includes: a failure type determination unit configured to determine a failure type from among a plurality of preset failure type candidates, when a vehicle-induced failure occurs in an automated vehicle under autonomous driving in accordance with the instruction, an evacuation space determination unit configured to determine an evacuation space based on the failure type determined by the failure type determination unit, the position information of the autonomous driving vehicle, and the parking lot map information, and a vehicle instruction unit configured to execute an evacuation instruction to evacuate the autonomous driving vehicle to the evacuation space.

10 Claims, 8 Drawing Sheets

(56) References Cited

U.S. PATENT DOCUMENTS

| | | | |
|---|---|---|---|
| 2015/0353080 A1 | 12/2015 | Mukaiyama | |
| 2016/0321929 A1* | 11/2016 | Nordbruch | G08G 1/141 |
| 2017/0021828 A1* | 1/2017 | Seo | B60W 10/182 |
| 2017/0329346 A1* | 11/2017 | Latotzki | G08G 1/164 |
| 2017/0351267 A1* | 12/2017 | Mielenz | B60W 30/06 |
| 2018/0005338 A1* | 1/2018 | Kazama | G06Q 30/0284 |
| 2018/0052460 A1* | 2/2018 | Kurt | G01C 21/3407 |
| 2018/0171655 A1* | 6/2018 | Scherer | E04H 6/18 |
| 2018/0229719 A1* | 8/2018 | Izumi | B62D 15/0285 |
| 2018/0345954 A1* | 12/2018 | Gougeon | B60W 50/14 |
| 2019/0039604 A1* | 2/2019 | Auracher | G05D 1/0225 |
| 2019/0061774 A1* | 2/2019 | Nordbruch | B60W 50/0205 |
| 2019/0171209 A1* | 6/2019 | Lee | G06Q 50/30 |
| 2019/0180618 A1* | 6/2019 | Nordbruch | G01C 21/34 |
| 2019/0212737 A1* | 7/2019 | Sonalker | G06V 20/586 |
| 2019/0243368 A1* | 8/2019 | Seki | B60W 60/00253 |
| 2019/0283736 A1* | 9/2019 | Watanabe | B60W 30/06 |
| 2019/0347934 A1* | 11/2019 | Hase | G05D 1/0022 |
| 2020/0055522 A1* | 2/2020 | Kasai | B60W 50/0225 |
| 2020/0062243 A1* | 2/2020 | Perez Barrera | G05D 1/028 |
| 2020/0108836 A1* | 4/2020 | Tanaka | G08G 1/168 |
| 2020/0130676 A1* | 4/2020 | Smid | B60W 30/06 |
| 2020/0148196 A1* | 5/2020 | Lim | G08G 1/0125 |
| 2020/0198620 A1* | 6/2020 | Nakata | B60W 60/0053 |
| 2020/0207337 A1* | 7/2020 | Kim | G08G 1/143 |
| 2020/0234593 A1* | 7/2020 | Mergenthaler | G08G 1/146 |
| 2021/0116926 A1* | 4/2021 | Inaba | G07C 5/008 |
| 2021/0180954 A1* | 6/2021 | Hiyokawa | G06V 10/48 |
| 2021/0316763 A1* | 10/2021 | Domahidi | B60W 40/105 |
| 2021/0331701 A1* | 10/2021 | Hur | G05D 1/0022 |
| 2021/0402989 A1* | 12/2021 | Khurewattanakul | G08G 1/14 |
| 2022/0208003 A1* | 6/2022 | Shirozono | G08G 1/148 |

\* cited by examiner

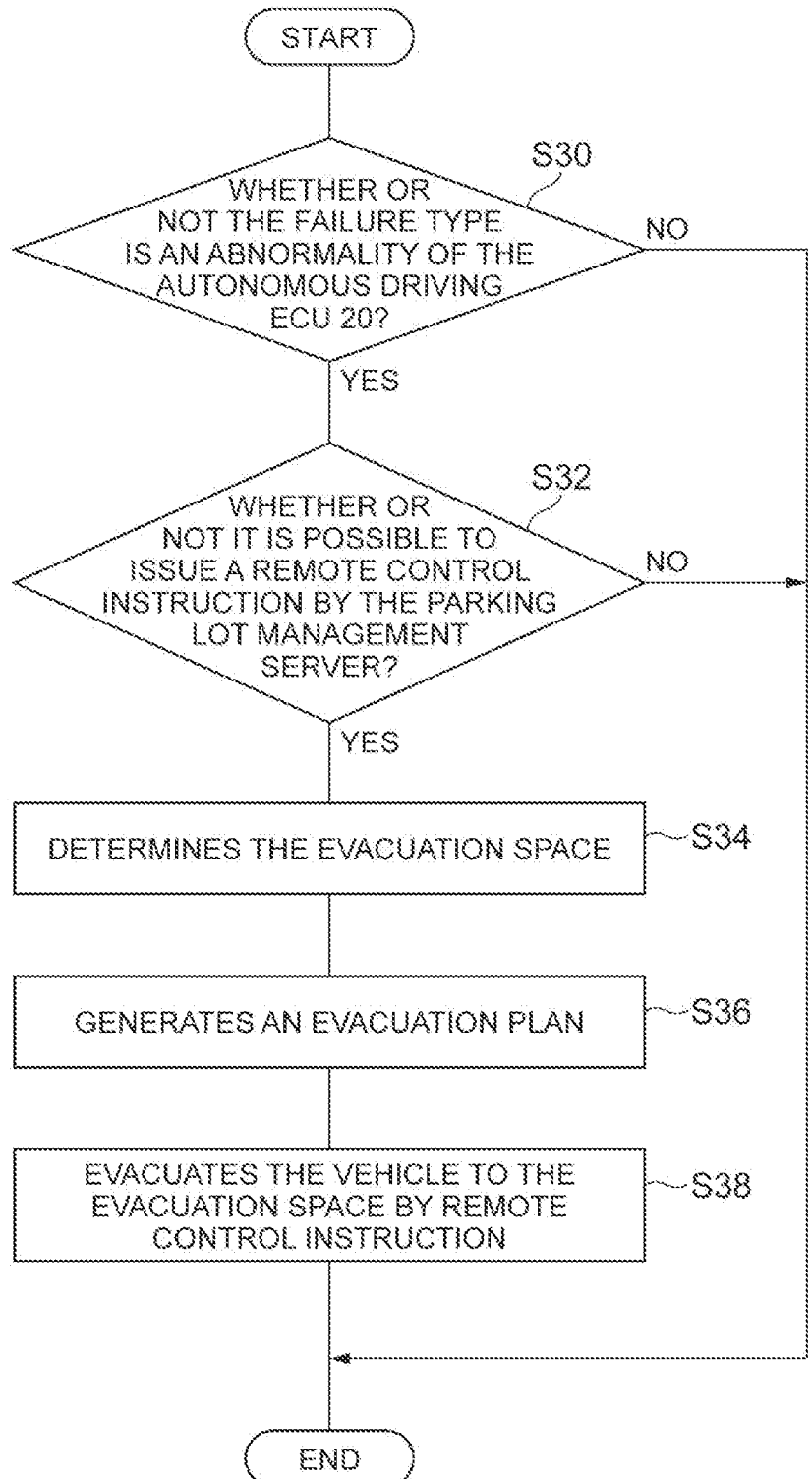

US 11,458,962 B2

AUTOMATIC PARKING SYSTEM

TECHNICAL FIELD

The present disclosure relates to an automatic parking system.

CROSS-REFERENCE TO RELATED APPLICATION

This application claims the benefit of priority from Japanese Patent Application No. 2019-194617, filed Oct. 25, 2019, the entire contents of which are incorporated herein by reference.

BACKGROUND

Japanese Patent Application Laid-Open No. 2015-230641 is known as a technical document related to an automatic parking system. This publication describes an automatic parking system in which an automatic valet parking automatically parks autonomous driving vehicles, wherein it is determined whether or not travel by autonomous driving control is possible when a contact determination between the autonomous driving vehicles and obstacles is made, and when it is determined that travel by autonomous driving control is possible, the autonomous driving vehicles are evacuated to the evacuation position determined based on the monitoring result of the monitoring device of the parking lot or the detection result of the on-board sensor of the autonomous driving vehicles.

SUMMARY

Incidentally, when it is possible to travel by autonomous driving control after the determination of contact between the autonomous driving vehicles and obstacles, there is a possibility that an abnormality has occurred in the autonomous driving vehicles that has caused contact with the obstacles. Since there are various types of abnormalities in autonomous driving vehicles, it may not be appropriate to determine the evacuation position uniformly.

According to an aspect of the present disclosure, An automatic parking system park autonomous driving vehicles in a target parking space in a parking lot by instructing the autonomous driving vehicle in the parking lot. The system includes: a failure type determination unit configured to determine a failure type from among a plurality of preset failure type candidates, when a vehicle-induced failure occurs in an automated vehicle under autonomous driving in accordance with the instruction, an evacuation space determination unit configured to determine an evacuation space based on the failure type determined by the failure type determination unit, the position information of the autonomous driving vehicle, and the parking lot map information, and a vehicle instruction unit configured to execute an evacuation instruction to evacuate the autonomous driving vehicle to the evacuation space.

According to this automatic parking system, since the evacuation space is instructed to the autonomous driving vehicles when a vehicle-induced failure occurs in the autonomous driving vehicles, it is possible to avoid the obstruction of the passage of other vehicles by continuing to stop there. In addition, according to this automatic parking system, since the evacuation space is instructed based on the failure type of the autonomous driving vehicles, it is possible to instruct the autonomous driving vehicles to evacuate to an appropriate evacuation space according to the failure type, as compared with the case where the evacuation space is uniformly instructed without considering the failure type.

In the automatic parking system according to an aspect of the present disclosure, the evacuation space determination unit and the vehicle instruction unit are provided in a parking lot management server that manages the parking lot.

In the automatic parking system according to an aspect of the present disclosure, the vehicle instruction unit causes the autonomous driving vehicle to evacuate to the evacuation space by the remote control instruction when the failure type is an autonomous driving ECU abnormality and a remote control instruction for steering the autonomous driving vehicle and for the vehicle speed is possible.

In the automatic parking system according to an aspect of the present disclosure, the evacuation space determination unit secures two parking spaces adjacent to each other in the parking lot, and sets the two parking spaces as the evacuation space when the failure type is an abnormality of an external sensor of the autonomous driving vehicle.

In the automatic parking system according to an aspect of the present disclosure, the evacuation space determination unit sets the evacuation space to a flat position where the autonomous driving vehicles can reach without passing the slope when the failure type is a brake abnormality.

According to an aspect of the present disclosure, it is possible to instruct the autonomous driving vehicles to evacuate to an appropriate evacuation space according to the failure type.

BRIEF DESCRIPTION OF THE DRAWINGS

FIG. 8 is a flowchart showing an example of remote control instruction processing in the parking lot management server.

DETAILED DESCRIPTION

Hereinafter, embodiments of the present disclosure will be described with reference to the drawings.

Figure 1:
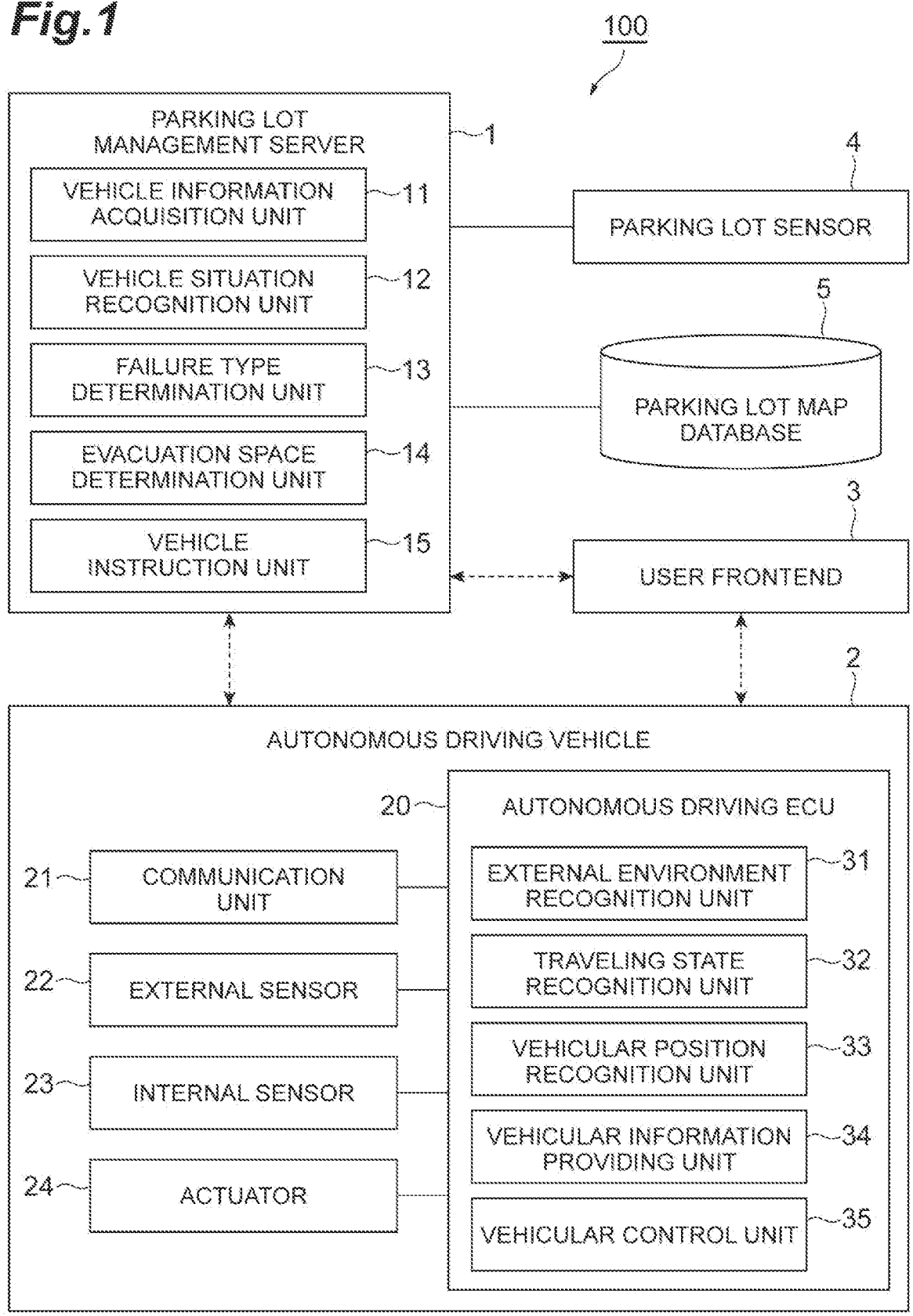
FIG. 1 is a block diagram showing an automatic parking system according to an embodiment.

FIG. 1 is a block diagram showing an automatic parking system 100 according to an embodiment. The automatic parking system [AVPS: Automated Valley Parking System etc.] 100 shown in FIG. 1 is a system for performing automated valet parking [Automated Valley Parking] of a plurality of autonomous driving vehicles 2 in a parking lot [Parking place].

The automatic valet parking is a service in which an unmanned autonomous driving vehicle 2 which has been dismounted by a user (passenger) at a disembarking area in a parking lot is driven along a target route by an instruction from the parking lot side, and is automatically parked in the target parking space in the parking lot. The target parking space is a parking space preset as a parking position of the autonomous driving vehicle 2. The target route is a route in the parking lot where the autonomous driving vehicle 2 travels to reach the target parking space. The target route at the time of exit is a route to travel to reach a pick-up space to be described later.

The parking lot may be a parking lot exclusively for an automatic valet parking, or may also be a parking lot for general vehicles not covered by the automatic valet parking. A part of the parking lot for general vehicles may be used as an area dedicated to the automatic valet parking. In this embodiment, a parking lot dedicated to an automatic valet parking is used as an example for explanation.

Figure 2:
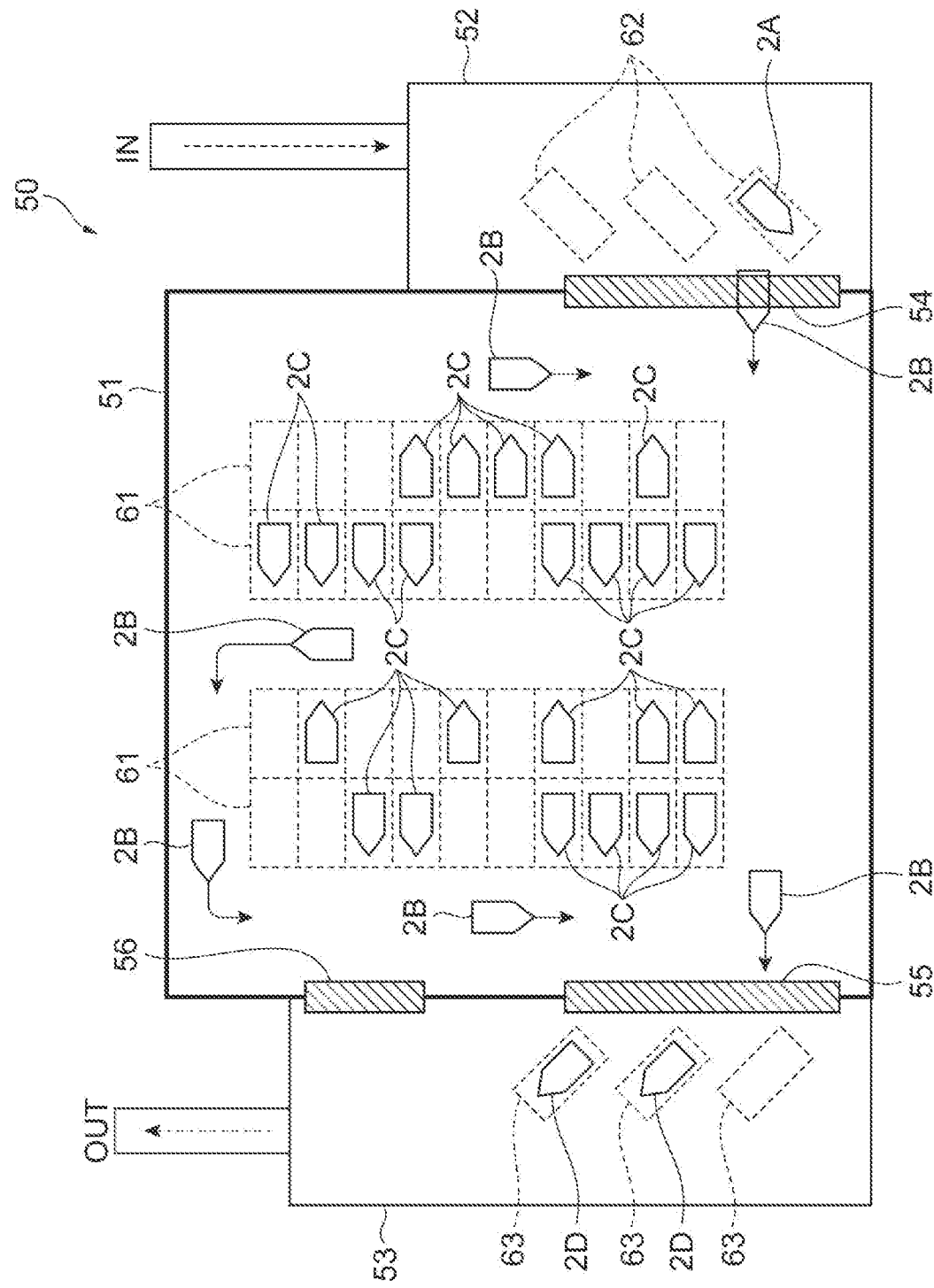
FIG. 2 is a plan view showing an example of a parking lot in which automatic valet parking is performed.

FIG. 2 is a plan view showing an example of a parking lot in which automatic valet parking is performed. FIG. 2 shows a parking lot 50 for an automatic valet parking, a parking area 51, a drop-off area 52, and a pick-up area 53. The parking lot 50 includes a parking area 51, a drop-off area 52, and a pick-up area 53. The drop-off area 52 and the pick-up area (boarding area) 53 need not be provided separately, but may be provided as an integrated area.

The parking area 51 is a place where a parking space 61 in which the autonomous driving vehicle 2 is parked by the automatic valet parking is formed. As shown in FIG. 2, for example, a plurality of parking spaces 61 are arranged in one direction (for example, a vehicle width direction in a parking vehicle).

The drop-off area 52 is provided on the entrance side of the parking lot 50, and is a place for passengers including users to get off from the autonomous driving vehicles 2 before entering the parking lot. In the drop-off area 52, there is formed a drop-off space 62 for stopping the autonomous driving vehicle 2 when the passenger gets off. The drop-off area 52 is connected to the parking area 51 via the entrance gate 54.

The pick-up area 53 is provided on the exit side of the parking lot 50, and is a place for passengers to board the exiting autonomous driving vehicles 2. A pick-up space 63 is formed in the pick-up area 53 for the autonomous driving vehicles 2 to stand by for boarding passengers. The pick-up area 53 is connected to the parking area 51 via the exit gate 55. A return gate 56 for returning the autonomous driving vehicle 2 from the pick-up area 53 to the parking area 51 is provided between the pick-up area 53 and the parking area 51. The return gate 56 is not essential.

Also shown in FIG. 2 are autonomous driving vehicles 2A stopping in the drop-off space 62 of the drop-off area 52, autonomous driving vehicles 2B running in the parking lot 50, autonomous driving vehicles 2C parking in the parking space 61 of the parking area 51, and autonomous driving vehicles 2D stopping in the pick-up space 63 of the pick-up area 53.

In the automatic parking system 100, for example, after the autonomous driving vehicles 2 entering the parking lot 50 have unloaded the passengers in the drop-off space 62 (corresponding to the autonomous driving vehicles 2A), the automatic valet parking is started with the instruction authority of the autonomous driving vehicles 2. The automatic parking system 100 drives the autonomous driving vehicle 2 toward the target parking space in the parking area 51 (corresponding to the autonomous driving vehicle 2B) and parks the autonomous driving vehicle 2 in the target parking space (corresponding to the autonomous driving vehicle 2C). The automatic parking system 100 drives the parked autonomous driving vehicle 2 toward the pick-up area 53 in response to a pick up request, and waits until the arrival of an occupant in the pick-up space 63. In the case, the autonomous driving vehicle 2 is corresponding to the autonomous driving vehicle 2D.

As shown in FIG. 1, the automatic parking system 100 includes a parking lot management server 1. The parking lot management server 1 is a server for managing parking lots. The parking lot management server 1 is configured to communicate with the autonomous driving vehicle 2 and the user frontend 3.

Configuration of Autonomous Driving Vehicle

First, an example of the configuration of the autonomous driving vehicle 2 will be described. As shown in FIG. 1, the autonomous driving vehicle 2 includes an autonomous driving ECU [Electronic Control Unit] 20. The autonomous driving ECU 20 is an electronic control unit having a CPU, a ROM, a RAM, etc. In the autonomous driving ECU 20, for example, various functions are realized by loading a program recorded in a ROM into a RAM and executing the program loaded into the RAM by a CPU. The autonomous driving ECU 20 may comprise a plurality of electronic units.

The autonomous driving ECU 20 is connected to the communication unit 21, the external sensor 22, the internal sensor 23, and the actuator 24.

The communication unit 21 is a communication device that controls wireless communication with the outside of the autonomous driving vehicle 2. The communication unit 21 transmits and receives various types of information through communication with the parking lot management server 1. For example, the communication unit 21 transmits the vehicle information to the parking lot management server 1, and acquires information necessary for the automatic valet parking (for example, information on landmarks along the target route) from the parking lot management server 1. The communication unit 21 communicates with the user frontend 3 associated with the autonomous driving vehicle 2.

The external sensor 22 is an on-vehicle sensor for detecting the external environment of the autonomous driving vehicle 2. The external sensor 22 includes at least a camera. The camera is an imaging device for imaging the external environment of the autonomous driving vehicle 2. The camera is provided, for example, on the rear side of the windshield of the autonomous driving vehicle 2, and images the front of the vehicle. The camera transmits imaging information relating to the external environment of the autonomous driving vehicle 2 to the autonomous driving ECU 20. The camera may be a monocular camera or a stereo camera. A plurality of cameras may be provided, and images of the left and right sides and the rear of the autonomous driving vehicle 2 may be taken in addition to the front.

The external sensor 22 may include a radar sensor. The radar sensor is a detection device that detects an object around the autonomous driving vehicle 2 using radio waves (e.g., millimeter waves) or light. The radar sensor includes, for example, a millimeter wave radar or LIDAR (Light Detection and Ranging). The radar sensor transmits radio waves or light to the vicinity of the autonomous driving vehicle 2, and detects an object by receiving the radio waves or light reflected by the object. The radar sensor transmits the detected object information to the autonomous driving ECU 20. The external sensor 22 may also include a sonar sensor that detects sounds outside the autonomous driving vehicle 2.

The internal sensor 23 is an on-vehicle sensor for detecting the running state of the autonomous driving vehicle 2. The internal sensor 23 includes a vehicle speed sensor, an accelerometer sensor, and a yaw rate sensor. The vehicle speed sensor is a detector for detecting the speed of the autonomous driving vehicle 2. As the vehicle speed sensor, a wheel speed sensor which is provided for a wheel of the autonomous driving vehicle 2 or a drive shaft which rotates integrally with the wheel and detects the rotational speed of each wheel can be used. The vehicle speed sensor transmits the detected vehicle speed information (wheel speed information) to the autonomous driving ECU 20.

The accelerometer is a detector that detects accelerations of the autonomous driving vehicle 2. The accelerometer may include, for example, a longitudinal accelerometer for detecting longitudinal accelerations of the autonomous driving vehicle 2. The accelerometer may include a lateral accelerometer for detecting lateral accelerations of the autonomous driving vehicle 2. The accelerometer transmits, for example, information on the accelerations of the autonomous driving vehicle 2 to the autonomous driving ECU 20. The yaw rate sensor is a detector for detecting a yaw rate (rotational angular velocity) about the vertical shaft of the center of gravity of the autonomous driving vehicle 2. As the yaw rate sensor, for example, a gyro sensor can be used. The yaw rate sensor transmits the detected autonomous driving information of the yaw rate of the autonomous driving vehicle 2 to the autonomous driving ECU 20.

The actuator 24 is a device used to control the autonomous driving vehicle 2. The actuator 24 includes at least a drive actuator, a brake actuator, and a steering actuator. The drive actuator controls the amount of air supplied to the engine (throttle opening) in accordance with a control signal from the autonomous driving ECU 20 to control the driving force of the autonomous driving vehicle 2. When the autonomous driving vehicle 2 is a hybrid vehicle, a control signal from the autonomous driving ECU 20 is input to a motor serving as a power source in addition to the amount of air supplied to the engine to control the driving force. When the autonomous driving vehicle 2 is an electric vehicle, a control signal from the autonomous driving ECU 20 is input to a motor serving as a power source to control the driving force. The motor as a power source in these cases constitutes the actuator 24.

The brake actuator controls the brake system according to a control signal from the autonomous driving ECU 20, and controls the braking force applied to the wheels of the autonomous driving vehicle 2. As the brake system, for example, a hydraulic brake system can be used. The steering actuator controls driving of an assist motor for controlling steering torque in the electric power steering system in accordance with a control signal from the autonomous driving ECU 20. Thus, the steering actuator controls the steering torque of the autonomous driving vehicle 2.

Next, an example of the functional configuration of the autonomous driving ECU 20 will be described. The autonomous driving ECU 20 includes an external environment recognition unit 31, a traveling state recognition unit 32, a vehicular position recognition unit 33, a vehicular information providing unit 34, and a vehicular control unit 35.

The external environment recognition unit 31 recognizes the external environment of the autonomous driving vehicle 2 based on the detection result of the external sensor 22 (the object information detected by the camera or the radar sensor). The external environment includes the relative positions of the surrounding objects with respect to the autonomous driving vehicles 2. The external environment may include the relative velocity and direction of movement of the surrounding objects relative to the autonomous driving vehicles 2. The external environment recognition unit 31 recognizes an object such as a pillar of another vehicle or a parking lot by pattern matching or the like. The external environment recognition unit 31 may recognize the gate of the parking lot, the wall of the parking lot, the pole, the safety cone, etc. The external environment recognition unit 31 may recognize driving boundaries in the parking lot by lane line recognition.

The traveling state recognition unit 32 recognizes the traveling state of the autonomous driving vehicle 2 based on the detection result of the internal sensor 23. The traveling state includes the vehicle speed of the autonomous driving vehicle 2, the accelerations of the autonomous driving vehicle 2, and the yaw rate of the autonomous driving vehicle 2. Specifically, the traveling state recognition unit 32 recognizes the vehicle speed of the autonomous driving vehicle 2 based on the vehicle speed information of the vehicle speed sensor. The traveling state recognition unit 32 recognizes the accelerations of the autonomous driving vehicles 2 based on the vehicle speed information of the accelerometers. The traveling state recognition unit 32 recognizes the direction of the yaw rate of the autonomous driving vehicle 2 based on the yaw rate information of the autonomous driving sensor.

The vehicular position recognition unit 33 recognizes the position of the autonomous driving vehicle 2 in the parking lot based on the parking lot map information acquired from the parking lot management server 1 through the communication unit 21 and the external environment recognized by the external environment recognition unit 31.

The vehicular position recognition unit 33 recognizes the position of the autonomous driving vehicle 2 in the parking lot based on the position information of the landmarks in the parking lot included in the parking lot map information and the relative position of the landmarks with respect to the autonomous driving vehicle 2 recognized by the external environment recognition unit 31. As the landmark, an object fixed to the parking lot can be used. As the landmark, for example, at least one of a pillar of a parking lot, a wall of the parking lot, a pole, a safety cone, and the like is used. A running boundary may be used as the landmark.

In addition, the vehicular position recognition unit 33 may recognize the position of the autonomous driving vehicle 2 by dead reckoning based on the detection result of the internal sensor 23. The vehicular position recognition unit 33 may recognize the position of the autonomous driving vehicle 2 by communication with a beacon provided in the parking lot.

The vehicular information providing unit 34 provides the vehicle information to the parking lot management server 1 through the communication unit 21. For example, the vehicular information providing unit 34 provides the parking lot management server 1 with vehicle information including information on the position of the autonomous driving vehicle 2 in the parking lot recognized by the vehicular position recognition unit 33 at regular intervals.

When a vehicle-induced failure (abnormality) is detected by the autonomous driving ECU 20, the vehicle-induced information providing unit 34 provides the parking lot management server 1 with vehicle-induced information including failure information relating to the vehicle-induced failure. The vehicle-induced failure includes at least one of an abnormality in the autonomous driving ECU 20, an abnormality in the external sensor 22, an abnormality in the internal sensor 23, an abnormality in the actuator 24, and an abnormality in the power supply. The actuator abnormality includes at least one of a brake actuator abnormality, an engine actuator abnormality, and a steering actuator abnormality. The actuator malfunction may include a parking brake control actuator malfunction or a shift control actuator malfunction.

The vehicle-caused failure may include a brake abnormality that is an abnormality of a brake system including a brake actuator (for example, a hydraulic brake system), a steering abnormality that is an abnormality of an electric power steering system including a steering actuator, or an engine abnormality that is an abnormality of an engine system including an engine actuator.

The autonomous driving ECU 20 may detect a vehicle-induced failure based on, for example, operation information or diagnostic information of each device. The autonomous driving ECU 20 may detect an abnormality in the autonomous driving ECU 20 by a self-diagnosis function. For example, the autonomous driving ECU 20 may detect an abnormality of the external sensor 22 when a certain period of time elapses while the output of the external sensor 22 is 0, or when the time change of the output of the external sensor 22 exceeds an abnormality threshold value. The same applies to the internal sensor 23.

The autonomous driving ECU 20 may detect a failure when the difference between the target control value corresponding to the control signal transmitted to the actuator 24 and the actual output value of the autonomous driving vehicle 2 detected by the internal sensor 23 is equal to or greater than an allowable threshold value. Specifically, when the difference between the target deceleration corresponding to the control signal transmitted to the brake actuator and the actual deceleration detected by the accelerometer is equal to or greater than the allowable threshold value, the autonomous driving ECU 20 may detect that there is an abnormality in the brake actuator or the accelerometer. The abnormality detection can also be performed at the vehicle speed or yaw rate. The method of detecting the failure caused by the vehicle is not particularly limited, and various methods can be adopted.

When the vehicular information providing unit 34 recognizes the failure type, it transmits the failure information including the information of the failure type to the parking lot management server 1. It is to be noted that the abnormal threshold value and the allowable threshold value are thresholds of preset values. The threshold value used in the following description also means a threshold value of a preset value.

The vehicular control unit 35 executes autonomous driving of the autonomous driving vehicle 2. At autonomous driving, the autonomous driving vehicle 2 is automatically driven along the target route instructed from the parking lot management server 1. The vehicular control unit 35 generates a trajectory of the autonomous driving vehicles 2 based on, for example, the target route, the position of the autonomous driving vehicles 2, the external environment of the autonomous driving vehicles 2, and the traveling state of the autonomous driving vehicles 2. The trajectory corresponds to the travel plan of autonomous driving. The trajectory includes the path along which the vehicles travel in autonomous driving [path] and the vehicle speed plan in autonomous driving.

The path is a locus along which vehicles in the autonomous driving are to travel on the target route. The path may be, for example, data (steering plan) of the steering angle change of the autonomous driving vehicle 2 according to the position on the target route. The position on the target route is, for example, a set vertical position set at predetermined intervals (for example, 1 m) in the traveling direction of the target route. The steering plan is data in which the target steering angle is associated with each set vertical position.

The vehicular control unit 35 generates a course so as to pass through the center of the travel path of the parking lot along the target route, for example. When the upper limit vehicle speed is instructed from the parking lot management server (1), the vehicular control unit (35) generates a course so that the vehicle speed plan does not exceed the upper limit vehicle speed. The vehicular control unit 35 may generate a route using the parking lot map information acquired through communication with the parking lot management server 1.

The vehicular control unit 35 stops the autonomous driving vehicle 2 when receiving a stop instruction from the parking lot management server 1. The vehicular control unit 35 advances the stopped autonomous driving vehicle 2 when receiving a progress instruction from the parking lot management server 1. Although an example of the configuration of the autonomous driving vehicle 2 has been described above, the configuration of the autonomous driving vehicle 2 is not limited to the above-described content as long as it is capable of realizing automatic valet parking.

Configuration of User Terminal

Next, an example of the configuration of the user frontend 3 will be described. The user frontend 3 is a user's portable information terminal associated with the autonomous driving vehicle 2. The user frontend 3 is registered in the autonomous driving vehicle 2 as a terminal of the owner of the autonomous driving vehicle 2, for example. The user frontend 3 may be a terminal of a user registered as an authorized person in the autonomous driving vehicle 2 by a temporary owner by rental and by the transfer of the instruction authority from the owner. The user frontend 3 is constituted by a computer including a processor such as a CPU, a memory such as a ROM or a RAM, and a user interface. The user interface includes a display and/or touch panel.

The user frontend 3 has a function of issuing an entry request and an exit request to the parking lot management server 1. By operating the user frontend 3, the user can make an automatic valet parking entry and exit request. For example, after the user stops and gets off the autonomous driving vehicle 2 in the drop-off space 62 of the drop-off area 52 of the parking lot 50, the user operates the user frontend 3 to complete the entrance request, thereby giving the parking lot management server 1 the authority to instruct the autonomous driving vehicle 2.

The user makes the autonomous driving vehicle 2 parked in the parking space 61 travel to the pick-up space 63 of the pick-up area 53 via the parking lot management server 1 by issuing an exit request. The autonomous driving vehicle 2 waits for the user in the pick-up space 63. For example, when the autonomous driving vehicle 2 arrives at the pick-up space 63 and stops, the parking lot management server 1 terminates the authority to instruct the autonomous driving vehicle 2. The instruction authority may be terminated when the user issues an instruction to open or start the autonomous driving vehicle 2. Autonomous driving vehicle 2 may terminate the instruction authority. It is to be noted that the operation of the autonomous driving vehicle 2 in response to the entrance request and the exit request is not limited to the above-described mode. The same applies to the parking lot management server 1.

Configuration of Automatic Parking System

An example of the configuration of the automatic parking system 100 will be described below. As shown in FIG. 1, the automatic parking system 100 includes a parking lot management server 1. The parking lot management server 1 is a server for managing parking lots.

The parking lot management server 1 is configured to communicate with the autonomous driving vehicle 2 and the user frontend 3. The autonomous driving vehicle 2 and the user frontend 3 will be described in detail later. The parking lot management server 1 may be provided in a parking lot or in a facility away from the parking lot. The parking lot management server 1 may comprise a plurality of computers provided at different locations.

The parking lot management server 1 is connected to the parking lot sensor 4 and the parking lot map database 5. The parking lot sensor 4 is a sensor for recognizing the situation in the parking lot 50. The parking lot sensor 4 includes an empty vehicle sensor for detecting whether a parking vehicle exists in each parking space (whether each parking space is full or empty).

The empty vehicle sensor may be provided for each parking space. The empty vehicle sensor may be provided on the ceiling for monitoring a plurality of parking spaces. The configuration of the empty vehicle sensor is not particularly limited, and a configuration of known can be adopted. The empty vehicle sensor may be a pressure sensor, a radar sensor or a sonar sensor using radio waves, or a camera. The empty vehicle sensor transmits detection information of a parked vehicle in the parking space to the parking lot management server 1.

The parking lot sensor 4 may include a monitoring camera for detecting the autonomous driving vehicles 2 running on the running road of the parking lot 50. The monitoring camera is provided on the ceiling or the wall of the parking lot, and captures an image of the moving autonomous driving vehicle 2. The monitoring camera transmits the captured image to the parking lot management server 1.

The parking lot map database 5 is a database storing parking lot map information. The parking lot map information includes positional information of the parking space in the parking lot, positional information of the disembarking space, positional information of the pick-up space, and information of the travel route in the parking lot. The parking lot map information includes position information of landmarks used by the autonomous driving vehicle 2 for position recognition.

Figure 3:
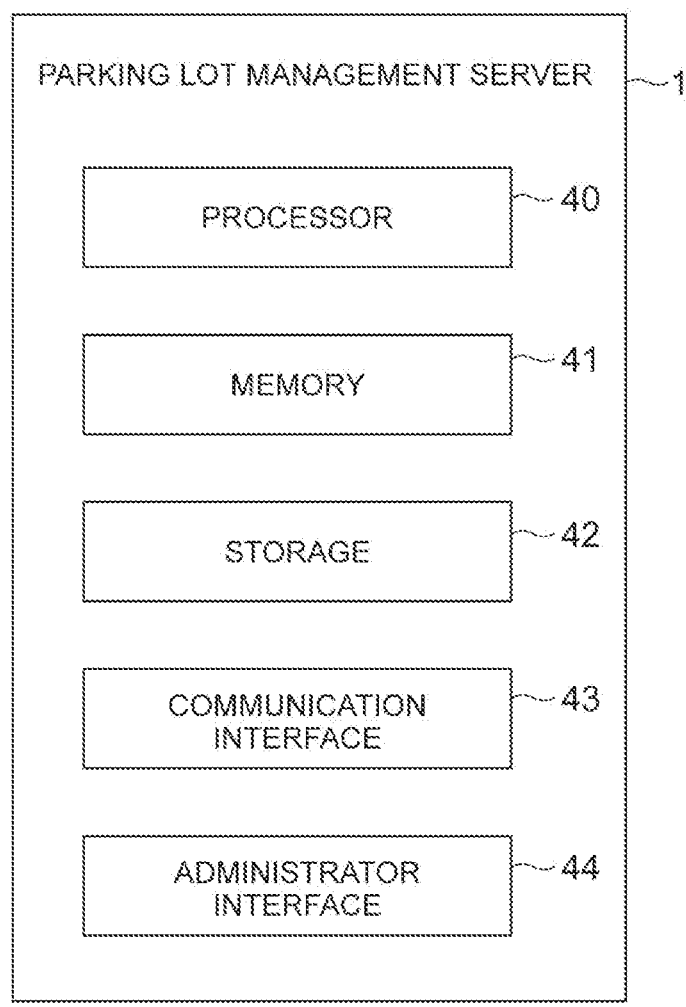
FIG. 3 is a block diagram showing an example of the hardware configuration of the parking lot management server.

First, the hardware configuration of the parking lot management server 1 will be described. FIG. 3 is a block diagram showing an example of the hardware configuration of the parking lot management server. As shown in FIG. 3, the parking lot management server 1 is configured as a general computer having a processor 40, a memory 41, a storage 42, a communication interface 43, and an administrator interface 44.

The processor 40 operates various operating systems to control the parking lot management server 1. The processor 40 is an arithmetic unit such as a CPU [Central Processing Unit] including a control unit, an arithmetic unit, a register, etc. The processor 40 integrates the memory 41, the storage 42, the communication interface 43, and the administrator interface 44. The memory 41 is a recording medium such as a ROM [Read Only Memory] or a RAM [Random Access Memory]. The storage 42 is a recording medium such as an HDD [Hard Disk Drive].

The communication interface 43 is a communication device for performing wireless communication via a network. The communication interface 43 may be a network device, a network controller, a network card, or the like. The parking lot management server 1 communicates with the autonomous driving vehicle 2 and the user frontend 3 using the communication interface 43. The administrator interface 44 is an input/output unit of the parking lot management server 1 to the administrator of the parking lot management server 1. The administrator interface 44 includes an output device such as a display or a speaker, and an input device such as a touch panel.

Next, a functional configuration of the parking lot management server 1 will be described. As shown in FIG. 1, the parking lot management server 1 includes a vehicle information acquisition unit 11, a vehicle situation recognition unit 12, a failure type determination unit 13, an evacuation space determination unit 14, and a vehicle instruction unit 15.

The vehicle information acquisition unit 11 acquires the vehicle-information of the autonomous driving vehicle 2 through communication with the autonomous driving vehicle 2 which is an object of the automatic valet parking. The vehicle information includes identification information of the autonomous driving vehicle 2 and position information of the autonomous driving vehicle 2 in the parking lot. The identification information may be information that can identify each autonomous driving vehicle 2. The identification information may be an ID number, a vehicle number, an automatic valet parking reservation number, or the like.

The vehicle information may include the model of the autonomous driving vehicle 2, or may include the vehicle number in addition to the identification information. The vehicle information may include the parking reservation information such as the parking reservation time or the scheduled parking time. The vehicle information may include vehicle body information such as turning radius and vehicle width of the autonomous driving vehicle 2, and may include information on the autonomous driving function of the autonomous driving vehicle 2. The information on the autonomous driving function may include version information of the autonomous driving.

The vehicle information may include recognition results of the running state of the autonomous driving vehicles 2 and the external environment. The vehicle information may include information on the remaining mileage or remaining fuel of the autonomous driving vehicle 2. The vehicle information includes the failure information when a vehicle-induced failure occurs in the autonomous driving vehicle 2.

The vehicle situation recognition unit 12 recognizes the situation of the autonomous driving vehicle 2 in the automatic valet parking based on the vehicular information acquired by the vehicle information acquisition unit 11. The situation of the autonomous driving vehicle 2 includes the position of the autonomous driving vehicle 2 within the parking lot. The state of the autonomous driving vehicle 2 includes the communication state between the parking lot management server 1 and the autonomous driving vehicle 2. The vehicle situation recognition unit 12 may recognize the situation of the autonomous driving vehicle 2 based on the captured image of the autonomous driving vehicle 2 transmitted from the parking lot sensor 4.

When a vehicle-induced failure occurs in the autonomous driving vehicle 2 in the automatic valet parking in accordance with an instruction from the parking lot management server 1, the failure type determination unit 13 determines the failure type from a plurality of preset failure type candidates. Vehicle-induced failure is a failure that affects the continuation of automatic valet parking. The case where the vehicle-induced failure occurs in the autonomous driving vehicle 2 is, for example, the case where the failure information indicating the occurrence of the failure is transmitted from the autonomous driving vehicle 2.

Even if the failure information is included in the vehicle information, the failure type determination unit 13 does not need to recognize that the vehicle-induced failure has occurred unless the failure affects the continuation of the automatic valet parking.

The plurality of failure type candidates include at least one of an abnormality in the autonomous driving ECU 20, an abnormality in the external sensor 22, an abnormality in the internal sensor 23, an abnormality in the actuator 24, and an abnormality in the power supply. The actuator abnormality includes at least one of a brake actuator abnormality, an engine actuator abnormality, and a steering actuator abnormality. The actuator malfunction may include a parking brake control actuator malfunction or a shift control actuator malfunction.

Further, the plurality of failure type candidates may include a brake abnormality that is an abnormality of a brake system including a brake actuator, a steering abnormality that is an abnormality of an electric power steering system including a steering actuator, or an engine abnormality that is an abnormality of an engine system including an engine actuator.

The failure type determination unit 13 determines the failure type from a plurality of failure type candidates based on the vehicle information. When the failure type information in the vehicle information includes the failure type information, the failure type determination unit 13 determines the failure type from the failure type information.

The failure type determination unit 13 may determine the presence or absence and type of a failure caused by the vehicle from vehicle information other than the failure information. The failure type determination unit 13 may determine that there is an abnormality in the internal sensor 23 when a predetermined time elapses in a state in which each parameter (vehicle speed, accelerations, yaw rate, and the like) of the recognition result of the traveling state in the vehicle information exceeds the abnormality determination threshold value. In this case, it is not necessary for the failure type determination unit 13 to uniformly determine that the internal sensor 23 is abnormal. The failure type determination unit 13 may determine, based on the similarity between the change pattern of the parameter of the running state in the vehicle information and the previously stored abnormality change pattern for each failure type, which is not an abnormality of the internal sensor 23 but an abnormality of the engine actuator, an abnormality of the brake actuator, an abnormality of the steering actuator, or an abnormality of the autonomous driving ECU 20. The parameters of the external environment may be similarly determined.

The failure type determination unit 13 may determine the presence or absence and the failure type caused by the vehicle based on the vehicle information and the detection result of the parking lot sensor 4. When the difference between the position information of the autonomous driving vehicles 2 included in the vehicle information and the position of the autonomous driving vehicles 2 recognized from the detection result of the parking lot sensor 4 (for example, the captured image of the monitoring camera) is equal to or greater than the error threshold value, the failure type determination unit 13 may determine that an abnormality in position recognition (for example, an abnormality in position recognition due to an abnormality of the external sensor 22) has occurred in the autonomous driving vehicles 2 as a vehicle-induced failure.

The failure type determination unit 13 may determine that the external sensor 22 is abnormal when the actual environment detected by the parking lot sensor 4 is different from the external environment recognized by the autonomous driving vehicle 2, based on the recognition result of the external environment of the autonomous driving vehicle 2 included in the vehicle information and the environment around the autonomous driving vehicle 2 recognized from the detection result of the parking lot sensor 4. Specifically, when the preceding vehicle detected by the parking lot sensor 4 is not recognized by the autonomous driving vehicle 2, the failure type determination unit 13 may determine that the re is an abnormality in the external sensor 22. The failure type determination unit 13 may determine that the external sensor 22 is abnormal when the autonomous driving vehicle 2 does not recognize a structure such as a pillar of the parking lot with reference to the parking lot map information.

The failure type determination unit 13 may determine that there is an abnormality in the internal sensor 23 based on each parameter of the running state of the autonomous driving vehicle 2 included in the vehicle information and the running state of the autonomous driving vehicle 2 recognized from the detection result of the parking lot sensor 4. Specifically, when the difference between the vehicle speed of the autonomous driving vehicle 2 recognized from the detection result of the parking lot sensor 4 and the vehicle speed recognized by the autonomous driving vehicle 2 is equal to or greater than the vehicle speed error threshold value, the failure type determination unit 13 may determine that there is an abnormality in the internal sensor 23 (vehicle speed sensor). A similar determination can be made for accelerations or yaw rate. In addition, the failure type determination unit 13 can determine the failure type caused by the vehicles by various known methods.

The evacuation space determination unit 14 determines the evacuation space of the autonomous driving vehicles 2 in which the vehicle-induced failure has occurred, based on the failure type determined by the failure type determination unit 13, the position information of the autonomous driving vehicles 2, and the parking lot map information. When there are a plurality of candidates for the evacuation space, the evacuation space determination unit 14 may select the evacuation space that can be reached from the autonomous driving vehicle 2 by the shortest route.

When the failure type is an abnormality having little influence on the autonomous driving, the evacuation space determination unit 14 determines the parking space 61 nearest to the autonomous driving vehicle 2 as the evacuation space. The abnormality having little influence on the autonomous driving includes, for example, at least one of an abnormality in the control actuator of the parking brake, an abnormality in the control actuator of the shift, and an abnormality in the power supply of only the main power supply or the sub power supply.

Figure 4:
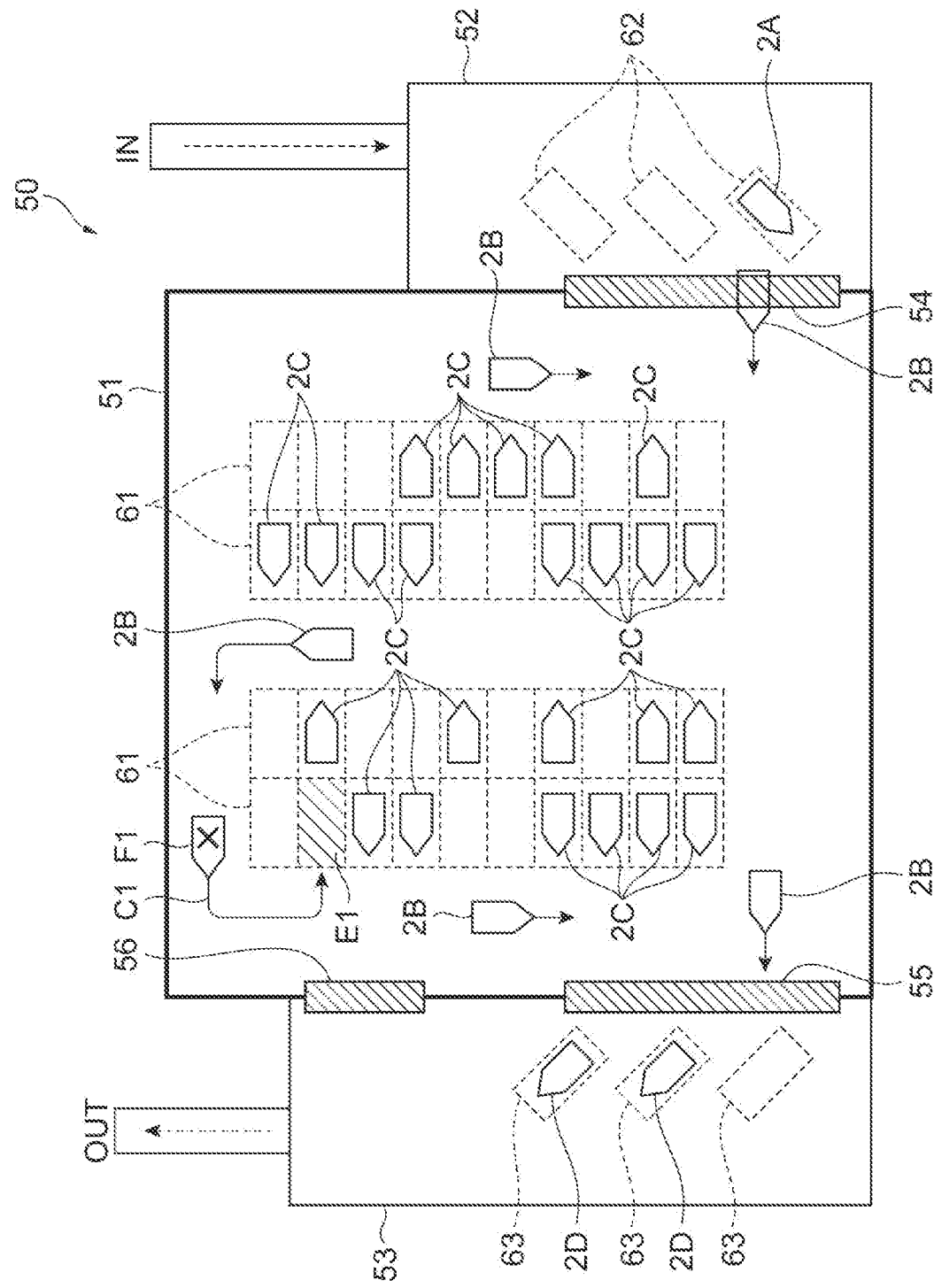
FIG. 4 is a plan view showing an example of the evacuation space when the failure of the autonomous driving vehicle occurs.

FIG. 4 is a plan view showing an example of the evacuation space in the case where the failure of the autonomous driving vehicle occurs. FIG. 4 is shown the failing vehicle F1, the evacuation space E1, and the escape route C1 of the failing vehicle F1. The failing vehicle F1 is the autonomous driving vehicle which the vehicle-induced failure has occurred.

As shown in FIG. 4, when the failure type is an abnormality having little influence on autonomous driving, the evacuation space determination unit 14 determines the parking space 61 nearest to the autonomous driving vehicle 2 as the evacuation space E1 based on the position information of the autonomous driving vehicle 2 and the parking lot map information. The evacuation space determination unit 14 does not necessarily designate the nearest parking space 61 as the evacuation space E1, and may designate the parking space 61 in which the change in the steering angle of the autonomous driving vehicle 2 along the evacuation route C1 is less than the steering angle threshold as the evacuation space E1.

When the failure type is an abnormality in the steering actuator, the evacuation space determination unit 14 may determine, as the evacuation space, the parking space 61 that can be reached by the autonomous driving vehicle 2 going straight or maintaining the current steering angle, based on the position information of the autonomous driving vehicle 2 and the parking lot map information. In this case, the evacuation space may be a space straddling a plurality of parking spaces 61. When there is no parking space 61 that the autonomous driving vehicle 2 can reach by going straight or maintaining the current steering angle, the evacuation space determination unit 14 may determine a position (for example, a corner of the travel path) that does not obstruct the passage of other vehicles on the travel path of the parking lot as the evacuation space.

Figure 5:
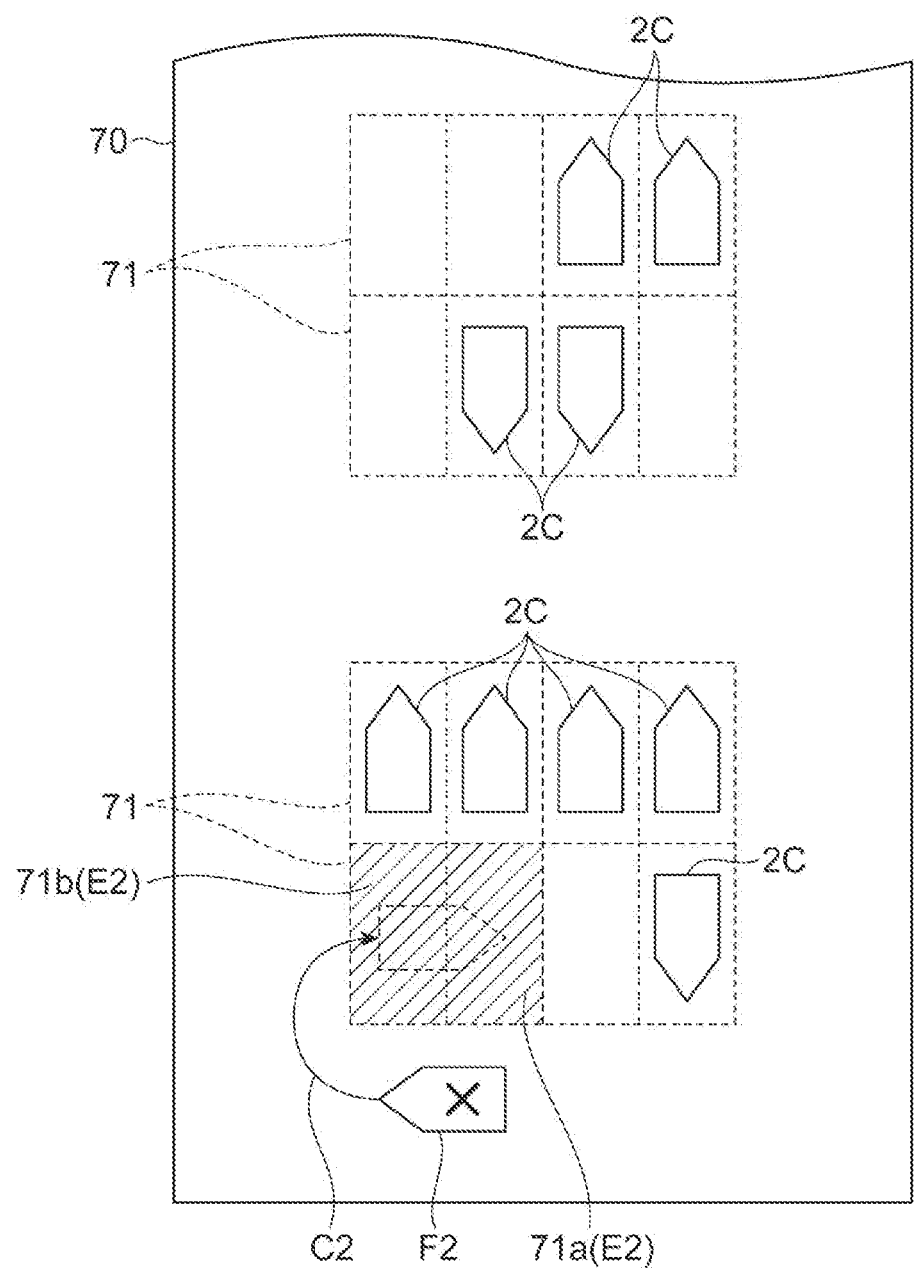
FIG. 5 is a plan view showing an example of an evacuation space when the failure type is an abnormality of an external sensor.

Next, a case where the failure type is an abnormality of an external sensor will be described. FIG. 5 is a plan view showing an example of an evacuation space when the failure type is an abnormality of an external sensor. FIG. 5 is shown the parking lot 70, the parking space 71, the parking vehicle 2C, the failing vehicle F2, the escape route C2 of the failing vehicle F2, and the evacuation space E2. The evacuation space E2 is provided so as to straddle the parking spaces 71a and 71b for two vehicles. The parking spaces 71a and 71b are parking spaces adjacent to each other in the vehicle width direction.

As shown in FIG. 5, when the failure type is an abnormality of the external sensor 22, the evacuation space determination unit 14 secures two parking spaces 71a and 71b (vacant parking spaces) adjacent to each other in the parking lot, and determines a position crossing the two parking spaces 71a and 71b as the evacuation space E2. The evacuation space E2 may not be the entire parking spaces 71a and 71b, but may be a part of the center of the combined parking spaces 71a and 71b.

When the failure type is an abnormality in the external sensor 22, the evacuation space determination unit 14 does not necessarily determine the parking space 71 for two vehicles as the evacuation space E2. The evacuation space E2 may be a parking space 71 for one vehicle or may be located at the side of the travel path. For example, the failing vehicle F2 saves by odometry based on the last position information before the abnormality occurs and the parking lot map information.

Figure 6A:
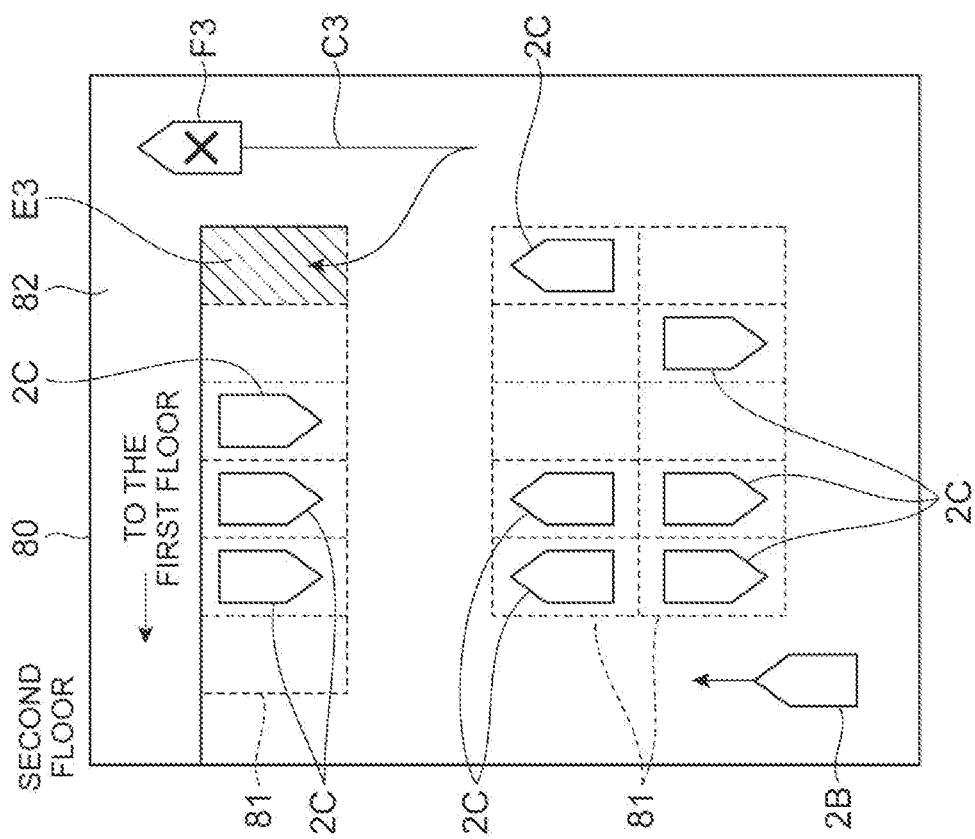
FIG. 6A is a plan view showing the first floor portion of the multi-story parking lot.
Figure 6B:
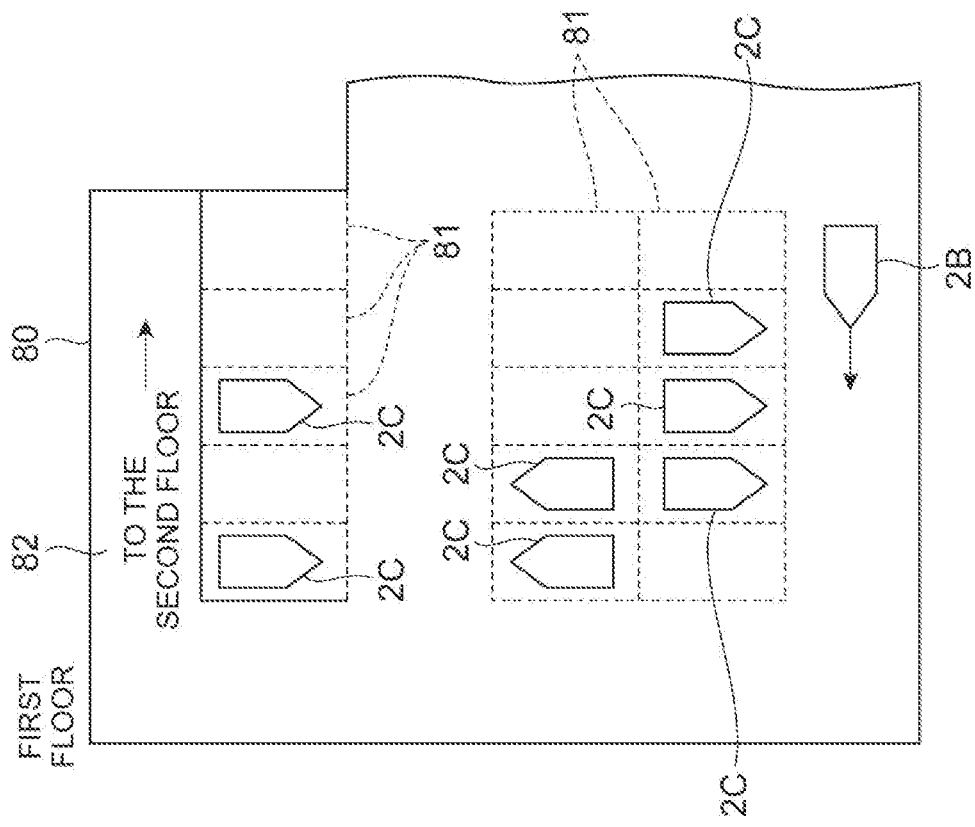
FIG. 6B is a plan view showing the second floor portion of the multi-story parking lot.

Next, a case where the failure type is a brake failure will be described. FIG. 6A is a plan view showing the first floor portion of the multi-story parking lot. FIG. 6B is a plan view showing the second floor portion of the multi-story parking lot.

FIG. 6A and FIG. 6B show the multistory parking lot 80, the parking space 81, the slope 82, the parking vehicle 2C, the failing vehicle F3, the escape route C3 of the failing vehicle F3, and the evacuation space E3. The slope 82 connects the first floor and the second floor of the multistory parking lot 80. The failing vehicle F3 is the autonomous driving vehicle 2 in which the failure occurred before entering the slope 82.

As shown in FIG. 6A and FIG. 6B, when the failure type is a brake failure, the evacuation space determination unit 14 determines, as the evacuation space E3, a flat position where the failing vehicle F3 can reach without passing through the slope (slope 82). As shown by the escape route C3, the failing vehicle F3 does not enter the slope 82, but withdraws to the evacuation space E3 provided in the parking space 81 on the second floor portion.

The slope is a running path having a slope on which the failing vehicle F3 may move by its own weight. The slope is not limited to the slope 82 connecting different floors in the multistory parking lot 80. The slope may be an uphill slope or a downhill slope. The slope may be a track having a slope angle (absolute value) greater than or equal to a preset slope threshold. The inclination threshold is not particularly limited, but may be 2 degrees or 3 degrees. A slope may be used instead of a slope angle. The flat position means such a flat position that the failing vehicle F3 does not move by its own weight. The flat position may be a position of slope less than the slope threshold.

Similarly, when the failure type is an abnormality of the engine actuator and a driving force due to creep is obtained, the evacuation space determination unit 14 may determine a flat position where the failing vehicle F3 can reach without passing the slope as the evacuation space E3. When the failure type is an abnormality of the engine actuator and the driving force is 0, the evacuation space determination unit 14 stops the failing vehicle F3 at the current position.

In addition, when the failure type is an abnormality of the internal sensor 23, the evacuation space determination unit 14 may determine the position of the side of the running path in front of the failing vehicle as the evacuation space so as not to obstruct the passage of other vehicles, since the position of the autonomous driving vehicle 2 is not recognized by the odometry. The failing vehicle withdraws based on the last position information before the occurrence of the abnormality or the position information recognized from the detection result of the external sensor 22.

Even when the failure type is an abnormality in the autonomous driving ECU 20, the evacuation space determination unit 14 may determine the position of the side of the running path in front of the failing vehicle as the evacuation space. In this case, the failing vehicle may be evacuated by remote control instruction from the parking lot management server 1.

The vehicle instruction unit 15 gives various instructions to the autonomous driving vehicle 2 that performs automatic valet parking. When the autonomous driving vehicle 2 starts the automatic valet parking, the vehicle instruction unit 15 instructs the target route to reach the target parking space of the autonomous driving vehicle 2. The method of determining the target parking space is not particularly limited. The parking spaces may be allocated from the exit side in the order of entry into the parking lot. The parking spaces may be allocated from the exit side in the order of closeness of the departure reservation time. The target parking space may be designated by the user.

When the evacuation space determination unit 14 determines the evacuation space for the failing vehicles, the vehicle instruction unit 15 issues an evacuation instruction to evacuate the failing vehicles (autonomous driving vehicles 2) to the evacuation space. The vehicle instruction unit 15 may only instruct the evacuation space as the evacuation instruction, or may instruct the evacuation space and the evacuation route to the evacuation space. The failing vehicle uses the autonomous driving function to evacuate to the evacuation space in accordance with the evacuation instruction.

When the failure type is an abnormality in the autonomous driving ECU 20 and a remote control instruction for steering and vehicle speed of the failing vehicle F1 is possible, the vehicle instruction unit 15 may evacuate the failing vehicle to the evacuation space by the remote control instruction. The remote control instruction is an instruction relating to steering and vehicle speed of the failed vehicle performed by the parking lot management server 1 instead of the failed vehicle.

The fact that the remote control instruction for steering the failing vehicle F1 and the vehicle speed is possible means that the failing vehicle F1 can be evacuated by the remote control instruction from the parking lot management server 1. When the autonomous driving ECU 20 is unable to recognize the remote control instruction, the vehicle instruction unit 15 determines that the remote control instruction is impossible. On the other hand, when the position of the failing vehicle can be recognized based on the detection result of the parking lot sensor 4 (for example, when the position of the failed vehicle can be recognized by image processing from the captured image of the monitoring camera), the vehicle instruction unit 15 can perform the remote control instruction even if the position recognition function in the autonomous driving ECU 20 is disturbed.

Similarly, when the running state of the failed vehicle can be recognized based on the detection result of the parking lot sensor 4 (for example, when the vehicle speed and direction of the failed vehicle can be recognized from the captured image of the monitoring camera), the vehicle instruction unit 15 can give a remote control instruction even if the autonomous driving ECU 20 has a problem in the function of recognizing the running state. When the outside environment of the failed vehicle can be recognized based on the detection result of the parking lot sensor 4 and the parking lot map information (for example, when the surrounding environment of the failed vehicle can be recognized based on the captured image of the monitoring camera and the parking lot map in formation), the vehicle instruction unit 15 can give a remote control instruction even if the function of the recognition of the outside environment is hindered in the autonomous driving ECU 20.

The vehicle instruction unit 15 calculates the evacuation route for the failing vehicles to reach the evacuation space based on the position information of the autonomous driving vehicles 2, the parking lot map information, and the evacuation space. The vehicle instruction unit 15 generates an evacuation plan (travel plan) including a steering plan and a vehicle speed plan for running the failing vehicle along the evacuation route. The vehicle instruction unit 15 transmits the evacuation plan to the failing vehicle as remote control instruction.

The vehicle instruction unit 15 may perform a remote control instruction by transmitting the steering target value and the vehicle speed target value for each of the behaviors such as straight traveling and turning right and left. The contents of the remote control instruction are not particularly limited, and various contents of the known can be used. Further, the vehicle instruction unit 15 may evacuate to the evacuation space by remote control instruction even if the failure type is an abnormality other than the autonomous driving ECU 20.

Automatic Parking System Processing

Next, the processing of the automatic parking system 100 will be described with reference to the drawings. FIG. 7A is a flowchart showing an example of failure information transmission processing in the autonomous driving vehicle. The failure information transmission process is executed in the autonomous driving vehicle 2 in the automatic valet parking.

As shown in FIG. 7A, the autonomous driving ECU 20 of the autonomous driving vehicle 2 determines whether or not a vehicle-induced failure has occurred in the autonomous driving vehicle 2. Whether or not a vehicle-induced failure has occurred is determined, for example, on the basis of the diagnosis result of the diagnosis function in each device of the autonomous driving vehicle 2. If the autonomous driving ECU 20 determines that a vehicle-induced failure has occurred (YES in S10), the autonomous driving ECU 20 proceeds to S12. If the autonomous driving ECU 20 does not determine that a vehicle-induced failure has occurred (NO in S10), the process ends. Thereafter, the autonomous driving ECU 20 repeats the process of S10 again after a certain period of time.

In S12, the autonomous driving ECU 20 transmits the vehicle information including the failure information to the parking lot management server 1 by the vehicular information providing unit 34. After that, the autonomous driving ECU 20 ends the current process and repeats the process from S10 again after a certain period of time.

Figure 7B:
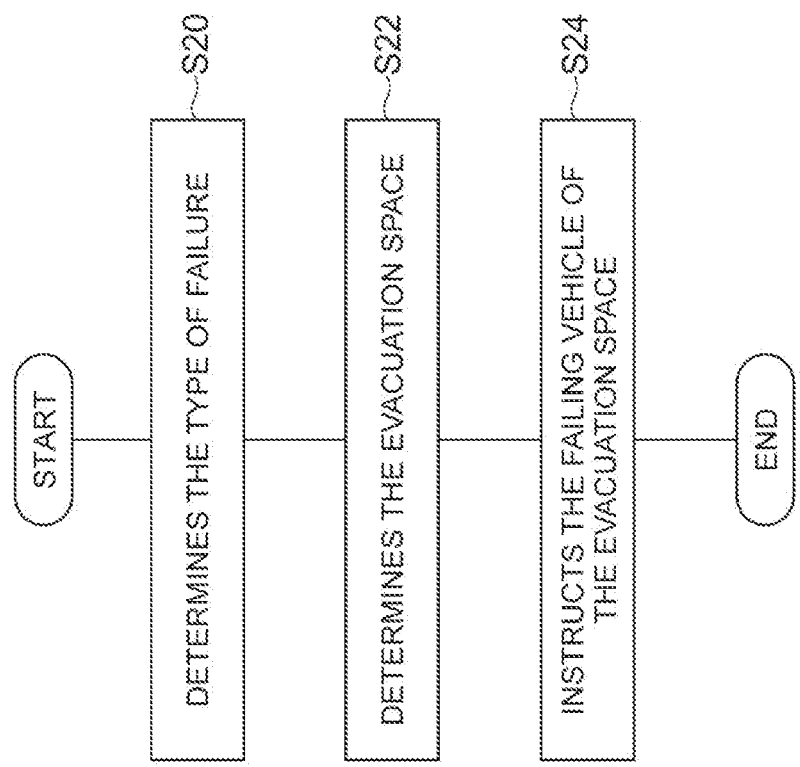
FIG. 7B is a flowchart showing an example of the evacuation process in the parking lot management server.
Figure 7A:
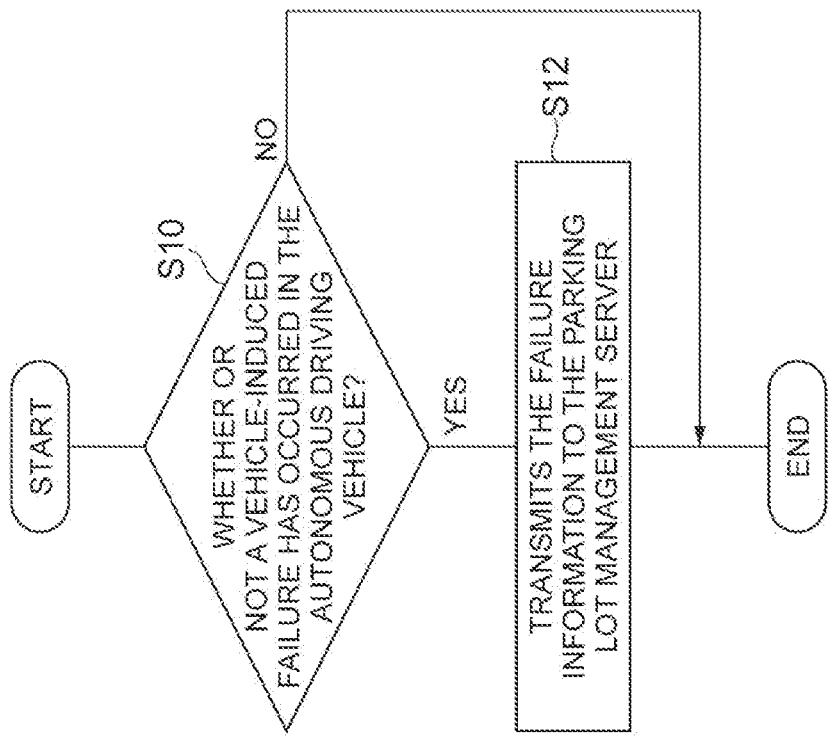
FIG. 7A is a flowchart showing an example of failure information transmission processing in the autonomous driving vehicle.

FIG. 7B is a flowchart showing an example of the evacuation process in the parking lot management server 1. The evacuation process in the parking lot management server 1 is performed, for example, when the failure information is transmitted from the autonomous driving vehicle 2.

As shown in FIG. 7B, in S20, the parking lot management server 1 determines the failure type by the failure type determination unit 13. The failure type determination unit 13 determines the failure type from a plurality of preset failure type candidates based on the vehicle information (failure information) transmitted from the autonomous driving vehicle 2. When the failure information includes the failure type information, the failure type determination unit 13 determines the failure type from the failure type information.

In S22, the parking lot management server 1 determines the evacuation space for the autonomous driving vehicles 2 by the evacuation space determination unit 14. Based on the failure type determined by the failure type determination unit 13, the position information of the autonomous driving vehicles 2, and the parking lot map information, the evacuation space determination unit 14 determines the evacuation space of the autonomous driving vehicles 2 in which vehicle-induced failure has occurred. When the failure type is an abnormality having little influence on the autonomous driving, the evacuation space determination unit 14 determines the parking space 61 nearest to the autonomous driving vehicle 2 as the evacuation space. When the failure type is an abnormality of the external sensor 22, the evacuation space determination unit 14 secures two parking spaces adjacent to each other in the parking lot, and determines a position crossing the two parking spaces 7 as a parking space. When the failure type is a brake failure, the evacuation space determination unit 14 determines a flat position, which can be reached without the failing vehicle passing the slope, as the evacuation space.

In S24, the parking lot management server 1 instructs the vehicle instruction unit 15 to evacuate the failed vehicle to the evacuation space. The vehicle instruction unit 15 instructs the failing vehicle of the evacuation space and/or the evacuation route as the evacuation instruction. When the failed vehicle stops at the evacuation space in accordance with the remote control instruction, the parking lot management server 1 ends the present process.

FIG. 8 is a flowchart showing an example of remote control instruction processing in the parking lot management server 1. The remote control instruction process is an aspect of the above-described saving process. As an example, the remote control instruction processing is performed when the failure information is transmitted from the autonomous driving vehicle 2.

As shown in FIG. 8, in step S30, the parking lot management server 1 determines whether or not the failure type is an abnormality of the autonomous driving ECU 20 by the failure type determination unit 13. When it is determined that the failure type is the abnormality of the autonomous driving ECU 20 (YES in S30), the parking lot management server 1 proceeds to S32. If it is not determined that the failure type is the abnormality of the autonomous driving ECU 20 (NO in S30), the parking lot management server 1 ends the present process. Alternatively, the parking lot management server 1 may shift to S22 in FIG. 7B.

In S32, the parking lot management server 1 determines whether or not it is possible to issue a remote control instruction for steering the failed vehicle and for the vehicle speed. When it is determined that the remote control instruction is possible (YES in S32), the parking lot management server 1 proceeds to step 34. If it is not determined that the remote control instruction is possible (NO in S32), the parking lot management server 1 ends the present process. Alternatively, the parking lot management server 1 may shift to S22 in FIG. 7B.

In step 34, the parking lot management server 1 determines the evacuation space for the autonomous driving vehicles 2 by the evacuation space determination unit 14. The evacuation space determination unit 14 determines, for example, a parking space 61 nearest to the autonomous driving vehicle 2 as an evacuation space. The evacuation space determination unit 14 may determine a position on the side of the travel route (or a parking space) that can be reached with a small change in steering angle as an evacuation space.

In step 36, the parking lot management server 1 generates an evacuation plan by the vehicle instruction unit 15. The vehicle instruction unit 15 calculates an evacuation route for the failing vehicles to reach the evacuation space on the basis of the position information of the autonomous driving vehicles 2, the parking lot map information, and the evacuation space, and generates an evacuation plan including a steering plan and a vehicle speed plan for the failing vehicles to travel along the evacuation route.

In step 38, the parking lot management server 1 saves the vehicle to the evacuation space by remote control instruction by the vehicle instruction unit 15. The vehicle instruction unit 15 transmits a remote control instruction including an evacuation plan to the failed vehicle. When the failed vehicle stops at the evacuation space in accordance with the remote control instruction, the parking lot management server 1 ends the present process.

According to the automatic parking system 100 according to the present embodiment described above, since the evacuation space is instructed to the autonomous driving vehicles 2 (failing vehicles) when a vehicle-caused failure occurs in the autonomous driving vehicles 2, it is possible to avoid blocking the passage of other vehicles by continuing to stop there. In addition, according to the automatic parking system 100, since the evacuation space is instructed based on the failure type of the autonomous driving vehicle 2, it is possible to instruct the autonomous driving vehicle 2 to evacuate to an appropriate evacuation space according to the failure type, as compared with the case where the evacuation space is uniformly instructed without considering the failure type.

In addition, according to the automatic parking system 100, since the evacuation space is determined by the parking lot management server 1 for managing the parking lot and the evacuation instruction is issued to the autonomous driving vehicles 2, it is possible to determine an appropriate evacuation space and issue the evacuation instruction based on the situation of the parking lot compared to the case where the autonomous driving vehicles 2 determine the evacuation space within the narrow range detectable by the external sensor 22.

Further, in the automatic parking system 100, when the failure type is an abnormality of the autonomous driving ECU 20, there is a possibility that the generation of the autonomous driving steering or the travel plan of the vehicle speed and the recognition result of the vehicle condition may be affected, and therefore, the remote control instruction for the steering and the vehicle speed from the parking lot management server 1 side can reduce the possibility of erroneous vehicle behavior occurring during the evacuation compared with the case where the evacuation is performed on the autonomous driving vehicle 2 side.

In the automatic parking system 100, when the failure type is an abnormality in the external sensor 22 of the autonomous driving vehicle 2, the position recognition of the autonomous driving vehicle 2 using the detection result of the external sensor 22 and the avoidance of contact with the objects around the autonomous driving vehicle 2 may be hindered. Therefore, the possibility that the autonomous driving vehicle 2 contacts with the surrounding objects can be reduced as compared with the case where only one parking space is used as the evacuation space, by securing the parking space for two adjacent vehicles and making the parking space for two vehicles as the evacuation space.

In the automatic parking system 100, when the failure type is a brake abnormality, there is a possibility that the autonomous driving vehicles 2 which are not braked may move by their own weight on the slope, and therefore, by setting a flat position which can be reached without passing the slope as the evacuation space, it is possible to avoid the autonomous driving vehicles 2 from being unintentionally moved by their own weight during the evacuation.

The embodiments of the present disclosure have been described, but the present disclosure is not limited to the above-described embodiments. The present disclosure can be implemented in various forms with various modifications and improvements based on the knowledge of a person skilled in the art, including the above-described embodiments.

The evacuation space determination unit 14 and/or the vehicle instruction unit 15 may be provided in a server other than the parking lot management server 1. For example, the vehicle instruction unit 15 may be provided in the vehicle management server that manages the autonomous driving vehicles 2. The vehicle management server is configured to communicate with the parking 1 of management server 1.

At least one of the failure type determination unit 13, the evacuation space determination unit 14, and the vehicle instruction unit 15 may be provided on the autonomous driving vehicle 2 side (autonomous driving ECU 20). In this case, a part of the autonomous driving ECU 20 may also constitute the automatic parking system 100.

What is claimed is:

1. An automatic parking system for parking autonomous driving vehicle in a target parking space in a parking lot by instructing the autonomous driving vehicle in the parking lot comprising:
    a failure type determination unit configured to determine a failure type from among a plurality of preset failure type candidates, when a vehicle-induced failure occurs in an automated vehicle under autonomous driving in accordance with the instruction,
    an evacuation space determination unit configured to determine an evacuation space based on the failure type determined by the failure type determination unit, position information of the autonomous driving vehicle, and parking lot map information,
    a vehicle instruction unit configured to execute an evacuation instruction to evacuate the autonomous driving vehicle to the evacuation space.

2. The automatic parking system according to claim 1, wherein the evacuation space determination unit and the vehicle instruction unit are provided in a parking lot management server that manages the parking lot.

3. The automatic parking system according to claim 2, wherein the vehicle instruction unit causes the autonomous driving vehicle to evacuate to the evacuation space by a remote control instruction when the failure type is an autonomous driving ECU abnormality and a remote control instruction for steering the autonomous driving vehicle and for a speed of the autonomous driving vehicle is possible.

4. The automatic parking system according to claim 1, wherein the evacuation space determination unit secures two parking spaces adjacent to each other in the parking lot, and sets the two parking spaces as the evacuation space when the failure type is an abnormality of an external sensor of the autonomous driving vehicle.

5. The automatic parking system according to claim 1, wherein the evacuation space determination unit sets the evacuation space to a flat position where the autonomous driving vehicle can reach without passing the slope when the failure type is a brake abnormality.

6. The automatic parking system according to claim 2, wherein the evacuation space determination unit secures two parking spaces adjacent to each other in the parking lot, and sets the two parking spaces as the evacuation space when the failure type is an abnormality of an external sensor of the autonomous driving vehicle.

7. The automatic parking system according to claim 3, wherein the evacuation space determination unit secures two parking spaces adjacent to each other in the parking lot, and sets the two parking spaces as the evacuation space when the failure type is an abnormality of an external sensor of the autonomous driving vehicle.

8. The automatic parking system according to claim 2, wherein the evacuation space determination unit sets the evacuation space to a flat position where the autonomous driving vehicle can reach without passing a slope when the failure type is a brake abnormality.

9. The automatic parking system according to claim 3, wherein the evacuation space determination unit sets the evacuation space to a flat position where the autonomous driving vehicle can reach without passing a slope when the failure type is a brake abnormality.

10. The automatic parking system according to claim 4, wherein the evacuation space determination unit sets the evacuation space to a flat position where the autonomous driving vehicle can reach without passing a slope when the failure type is a brake abnormality.

* * * * *